(12) United States Patent
Miyazawa (10) Patent No.: US 11,264,865 B2
(45) Date of Patent: Mar. 1, 2022

(54) ACTUATOR

(71) Applicant: SONY CORPORATION, Tokyo (JP)

(72) Inventor: Kiyokazu Miyazawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 104 days.

(21) Appl. No.: 16/483,226

(22) PCT Filed: Nov. 24, 2017

(86) PCT No.: PCT/JP2017/042300
§ 371 (c)(1),
(2) Date: Aug. 2, 2019

(87) PCT Pub. No.: WO2018/159032
PCT Pub. Date: Sep. 7, 2018

(65) Prior Publication Data
US 2020/0235636 A1    Jul. 23, 2020

(30) Foreign Application Priority Data

Feb. 28, 2017  (JP) .............................. JP2017-037363

(51) Int. Cl.
*H02K 7/116* (2006.01)
*H02K 11/21* (2016.01)
(Continued)

(52) U.S. Cl.
CPC .............. *H02K 7/116* (2013.01); *B25J 9/102* (2013.01); *F16H 49/001* (2013.01); *H02K 7/003* (2013.01);
(Continued)

(58) Field of Classification Search
CPC ........ H02K 7/116; H02K 11/21; H02K 11/24; H02K 7/003; H02K 7/083; H02K 7/102;
(Continued)

(56) References Cited

U.S. PATENT DOCUMENTS 5,155,423 A * 10/1992 Karlen ....................... B25J 9/04
                                                                318/568.1
6,477,918 B2 * 11/2002 Sakamoto .............. F16M 11/18
                                                                475/149

(Continued)

FOREIGN PATENT DOCUMENTS

GN    102594010 A    7/2012
JP    60-108175 U    7/1985
(Continued)

OTHER PUBLICATIONS

English machine translation, Miyamoto JP 2006-050710. (Year: 2006).*

(Continued)

*Primary Examiner* — Burton S Mullins
(74) *Attorney, Agent, or Firm* — Chip Law Group (57) ABSTRACT

An actuator capable of realizing a high output with a compact size is proposed. An actuator provided with a motor including a cylindrical rotor, and a reducer including an input shaft coaxial with a rotational shaft of the motor and nested in the rotor. The reducer has a cylindrical shape, the reducer further includes an output shaft coaxial with the rotational shaft of the motor, the motor further includes a stator, and the actuator is further provided with a casing which supports the reducer and the stator.

19 Claims, 9 Drawing Sheets

(51) Int. Cl.
*B25J 9/10* (2006.01)
*F16H 49/00* (2006.01)
*H02K 7/00* (2006.01)
*H02K 11/24* (2016.01)
*H02K 7/08* (2006.01)
*H02K 7/102* (2006.01)

(52) U.S. Cl.
CPC ............. *H02K 7/083* (2013.01); *H02K 7/102* (2013.01); *H02K 11/21* (2016.01); *H02K 11/24* (2016.01)

(58) Field of Classification Search
CPC ......... B25J 9/102; B25J 9/126; F16H 49/001; F16H 49/00; G01D 5/3473
USPC .................................................. 310/75 R, 77
See application file for complete search history.

(56) References Cited

U.S. PATENT DOCUMENTS

| | | | | |
|---|---|---|---|---|
| 6,701,803 | B1* | 3/2004 | Tamai | F16H 49/001 74/640 |
| 7,409,891 | B2* | 8/2008 | Takemura | F16H 49/001 74/640 |
| 7,752,943 | B2* | 7/2010 | Maruyama | H02K 7/116 74/640 |
| 8,067,869 | B2* | 11/2011 | Tominaga | H02K 16/00 310/77 |
| 8,161,827 | B2* | 4/2012 | Kato | G01L 3/1457 73/862.044 |
| 8,291,788 | B2* | 10/2012 | Ihrke | B25J 9/126 74/490.05 |
| 8,375,820 | B2* | 2/2013 | Tominaga | H02K 7/116 74/421 A |
| 9,293,962 | B2* | 3/2016 | Park | H02K 11/24 |
| 2010/0005907 | A1 | 1/2010 | Kato et al. | |
| 2012/0176007 | A1 | 7/2012 | Takeuchi | |
| 2015/0209958 | A1* | 7/2015 | Hasegawa | B25J 9/102 74/416 |

FOREIGN PATENT DOCUMENTS

| | | | | |
|---|---|---|---|---|
| JP | 2006-050710 | | * 2/2006 | ............. H02K 7/116 |
| JP | 2007-288870 | A | 11/2007 | |
| JP | 2008-263742 | A | 10/2008 | |
| JP | 2009-288198 | A | 12/2009 | |
| JP | 2010-004582 | A | 1/2010 | |
| JP | 2012-147541 | A | 8/2012 | |
| JP | 2014-238117 | A | 12/2014 | |
| JP | 2017-169331 | A | 9/2017 | |

OTHER PUBLICATIONS

International Search Report and Written Opinion of PCT Application No. PCT/JP2017/042300, dated Jan. 30, 2018, 12 pages of ISRWO.

* cited by examiner

ACTUATOR

CROSS REFERENCE TO RELATED APPLICATIONS

This application is a U.S. National Phase of International Patent Application No. PCT/JP2017/042300 filed on Nov. 24, 2017, which claims priority benefit of Japanese Patent Application No. JP 2017-037363 filed in the Japan Patent Office on Feb. 28, 2017. Each of the above-referenced applications is hereby incorporated herein by reference in its entirety.

TECHNICAL FIELD

The present disclosure relates to an actuator.

BACKGROUND ART

Actuators are conventionally used in various devices. For example, a robot arm obtained by connecting a plurality of arms via a joint at which a force control type actuator is joined is conventionally known. Here, force control is control that directly receives a target value of force to be applied to a work target, and drives the actuator on the basis of the target value. By correctly detecting and feeding back output torque in the force control, it becomes possible to realize flexible and safe operation excellent in interaction with human.

For example, Patent Document 1 described below discloses a motor with a wave reducer in which a motor is arranged inside a flex spline included in the wave reducer.

CITATION LIST

Patent Document

Patent Document 1: Japanese Patent Application Laid-Open No. 2010-4582

SUMMARY OF THE INVENTION

Problems to be Solved by the Invention

However, in the technology disclosed in Patent Document 1, since the motor is arranged inside the flex spline, only a motor smaller than the flex spline in size may be used. Therefore, with the technology disclosed in Patent Document 1, it is difficult to realize a high output.

Therefore, the present disclosure proposes a novel and improved actuator capable of realizing the high output with a small size.

Solutions to Problems

According to the present disclosure, an actuator provided with a motor including a cylindrical rotor, and a reducer including an input shaft coaxial with a rotational shaft of the motor and nested in the rotor.

Effects of the Invention

As described above, according to the present disclosure, the high output may be realized even when the actuator is small. Note that, the effects herein described are not necessarily limited and may be any of the effects described in the present disclosure.

MODE FOR CARRYING OUT THE INVENTION

Preferred embodiments of the present disclosure are hereinafter described in detail with reference to the accompanying drawings. Note that, in this specification and the drawings, the components having substantially the same functional configuration are assigned with the same reference sign, and the description thereof is not repeated.

Furthermore, in this specification and the drawings, there is a case in which a plurality of components having substantially the same functional configuration is distinguished from each other with different alphabets attached after the same reference sign. For example, a plurality of components having substantially the same functional configuration is distinguished from each other as motor magnets 242a and 242b as necessary. However, in a case where it is not necessary to especially distinguish a plurality of components having substantially the same functional configuration from each other, only the same reference sign is attached. For example, in a case where it is not necessary to especially distinguish the motor magnet 242a and the motor magnet 242b from each other, they are simply referred to as the motor magnets 242.

Furthermore, the "mode for carrying out the invention" is described according to the order of items described below.
1. Background
2. First Embodiment
3. Second Embodiment
4. Conclusion

1. BACKGROUND

The present disclosure may be implemented in various modes as described in "2. First Embodiment" and "3. Second Embodiment" as an example. First, in order to clearly describe a characteristic of the present disclosure, the background of creating an actuator according to each embodiment of the present disclosure is described.

Conventionally, for example, an actuator obtained by integrating a motor, a wave gear reducer, and an encoder is proposed. However, in the well-known technology, the motor, the wave gear reducer, and the encoder are separately selected, then a bracket part is interposed between the element parts, or a fastening unit is custom-combined to each element part to form the actuator. For this reason, a configuration becomes long in a rotational shaft direction of a motor (serial configuration), so that it has been difficult to make the actuator compact.

Note that, in order to make the actuator compact, a technology of arranging the motor inside a flex spline included in the wave gear reducer is also proposed. However, in this technology, only the motor smaller than the flex spline in size may be used, so that it is difficult to realize a high output.

Therefore, in view of the circumstances above, the actuator according to the embodiments of the present disclosure is created. The actuator is provided with a motor 20 including a cylindrical rotor 24 and a wave gear reducer 10 including an input shaft 104 coaxial with a motor shaft 26 and nested in the rotor 24. As a result, the high output may be realized even when the actuator is compact. Note that, the actuator may be a force control actuator.

Hereinafter, each embodiment of the present disclosure is sequentially described in detail. Note that, hereinafter, an actuator 2-1 and an actuator 2-2 according to first and second embodiments of the present disclosure, respectively, are sometimes collectively referred to as actuators 2.

2. FIRST EMBODIMENT

<2-1. Configuration>

Figure 1:
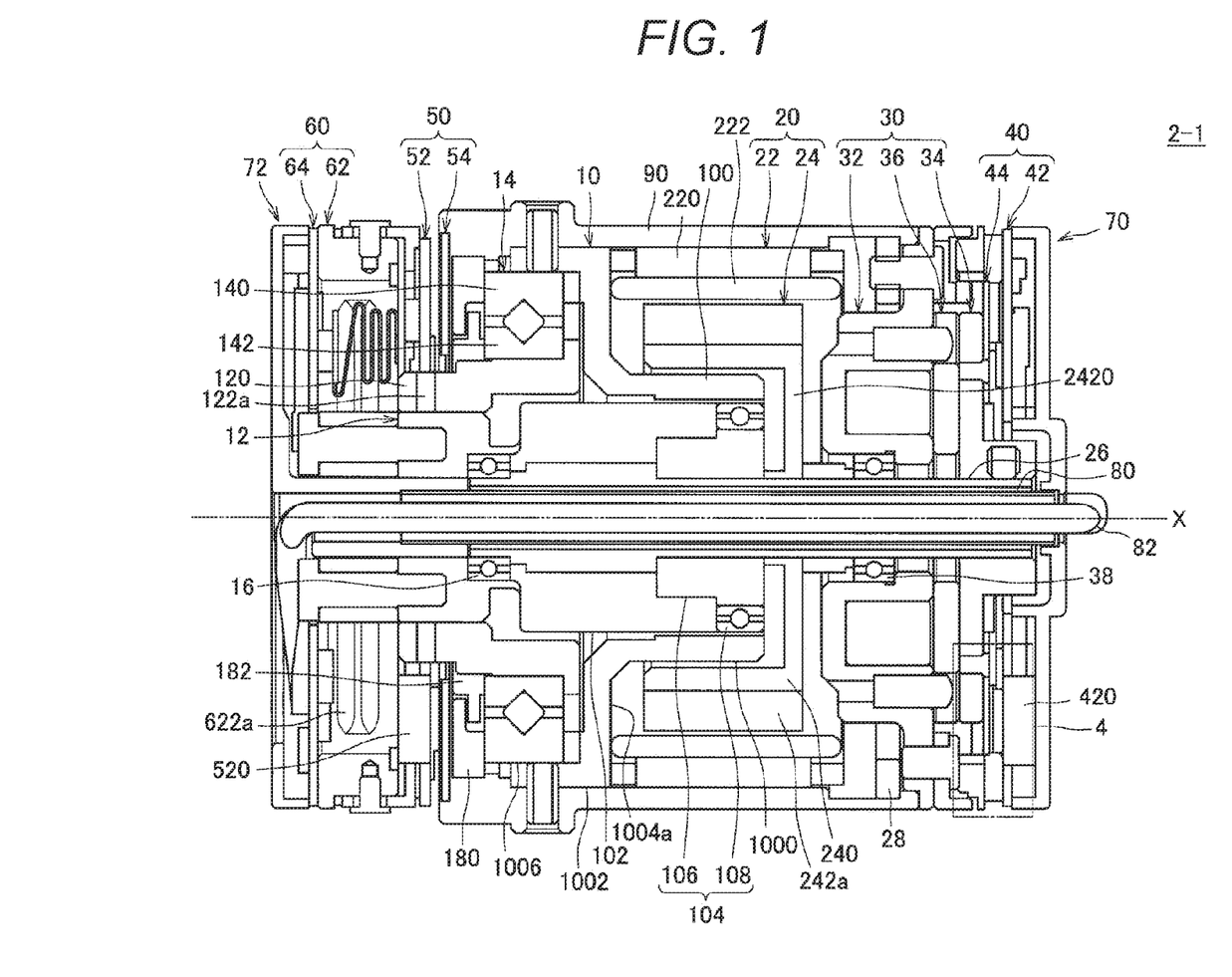
FIG. 1 is a cross-sectional view of an actuator 2-1 according to a first embodiment of the present disclosure.
Figure 2:
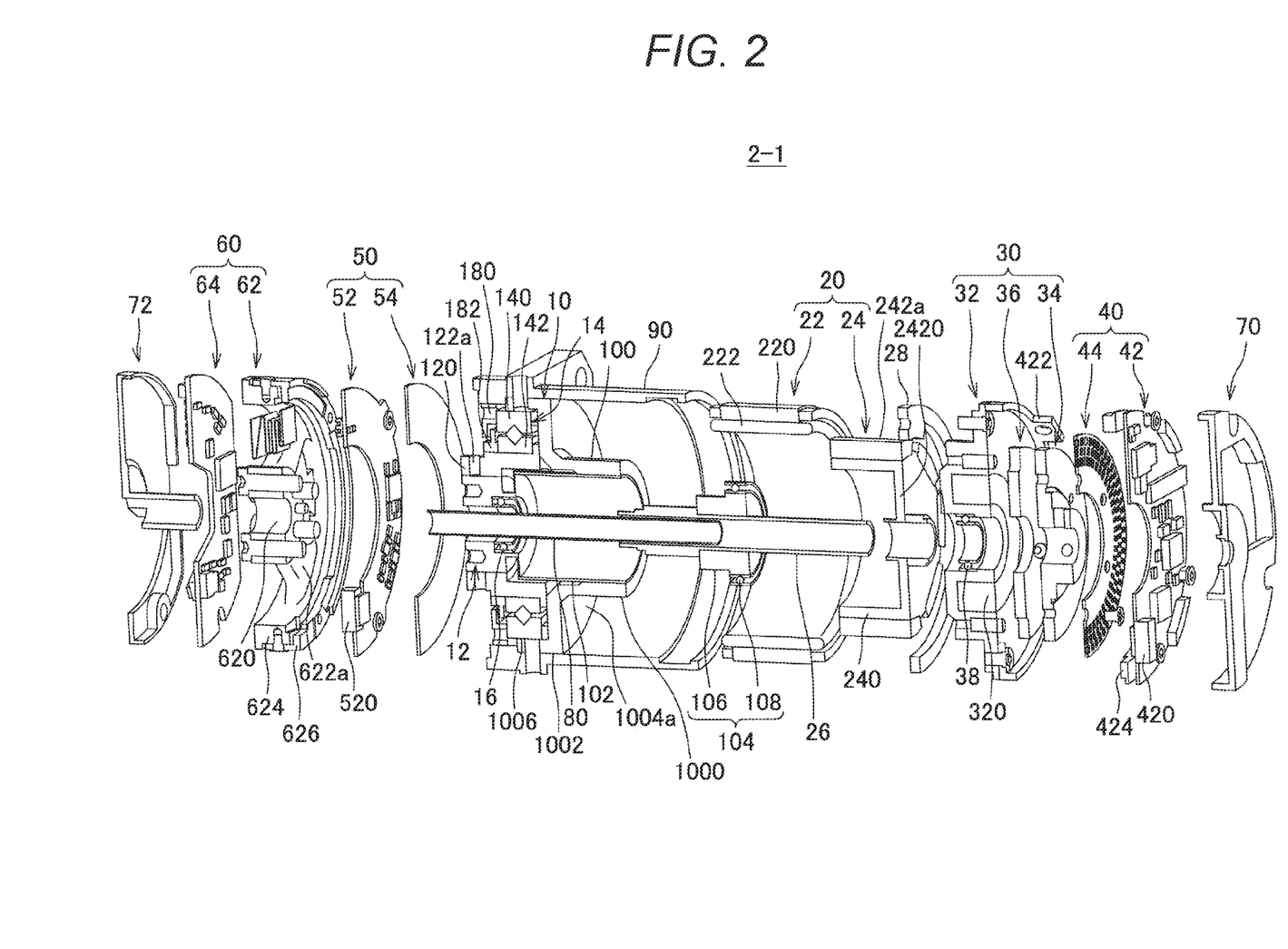
FIG. 2 is an exploded perspective view of the actuator 2-1.
Figure 3A:
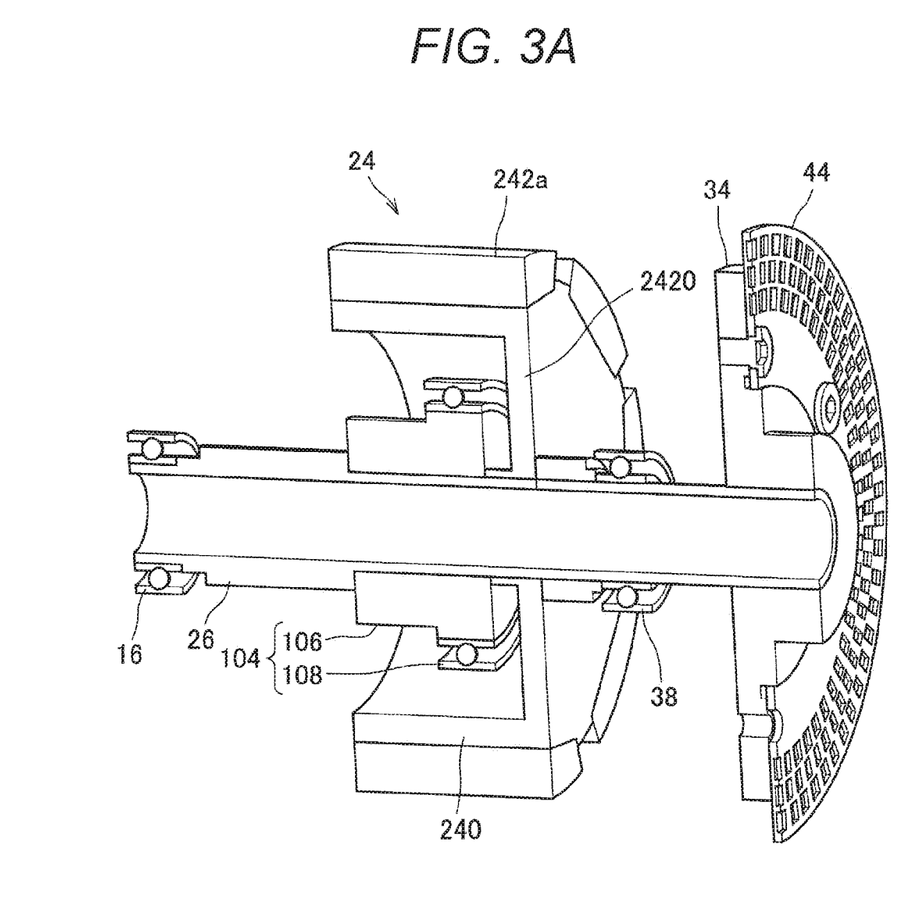
FIG. 3A is a schematic diagram illustrating parts on an input side of the actuator 2-1 in an enlarged manner.
Figure 3B:
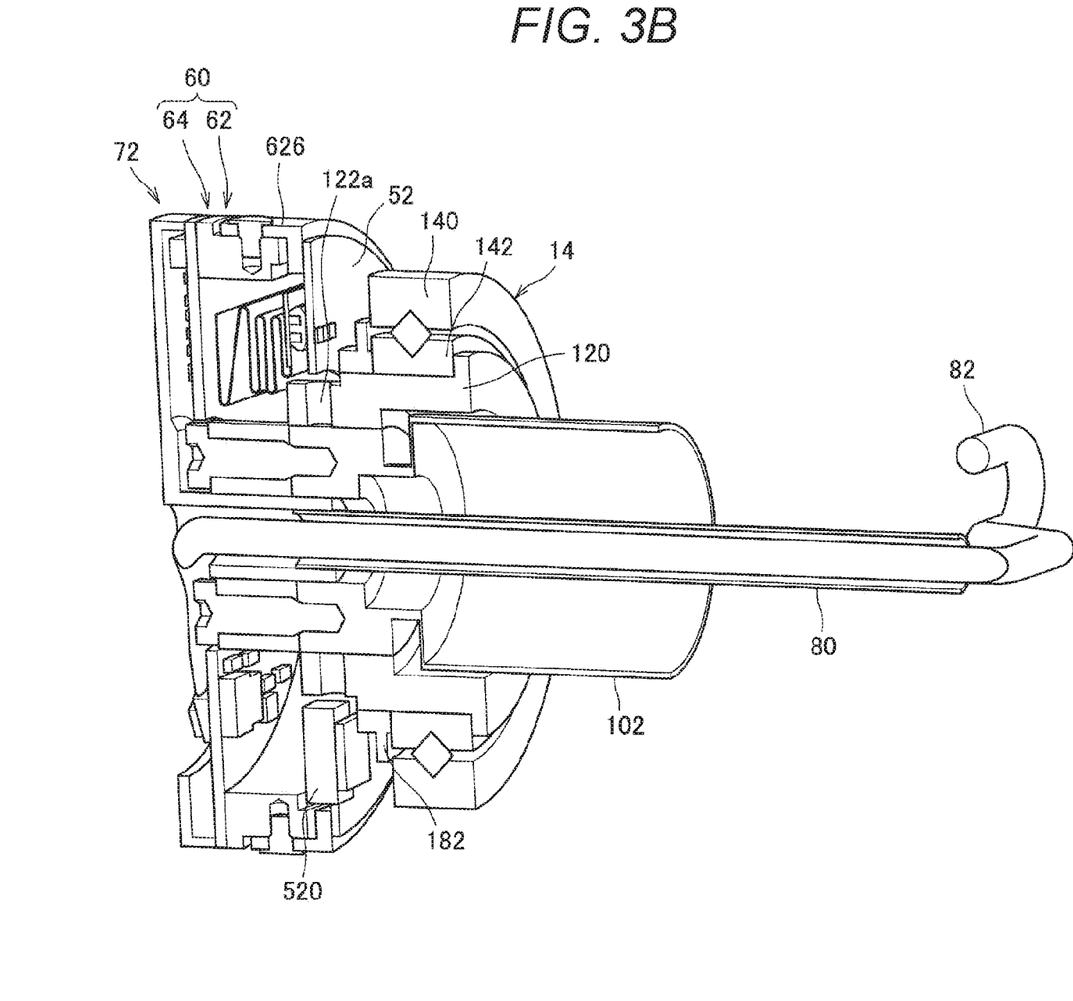
FIG. 3B is a schematic diagram illustrating parts on an output side of the actuator 2-1 in an enlarged manner.

First, a configuration of an actuator 2-1 according to a first embodiment is described with reference to FIGS. 1, 2, 3A, and 3B. FIG. 1 is a view illustrating a cross-section of the actuator 2-1. More specifically, FIG. 1 is a view illustrating the cross-section of the actuator 2-1 cut along a plane passing through a central axis X of a motor shaft 26 as described later and orthogonal to an axial direction of the motor shaft 26. Furthermore, FIG. 2 is an exploded perspective view illustrating the configuration of the actuator 2-1. Furthermore, FIG. 3A is a schematic diagram illustrating parts on an input side of the actuator 2-1 in an enlarged manner. Furthermore, FIG. 3B is a schematic diagram illustrating parts on an output side of the actuator 2-1 in an enlarged manner.

Here, the motor shaft 26 is an example of a rotational shaft of the motor in the present disclosure. Furthermore, the input side of the actuator 2-1 is a side opposite to a side on which a wave gear reducer 10 is located with respect to a motor (for example, a right side in FIG. 1). Furthermore, the output side of the actuator 2-1 is the side on which the wave gear reducer 10 is located with respect to the motor 20 (for example, a left side in FIG. 1). Note that the central axis X may be identical to a central axis of the actuator 2-1.

As illustrated in FIGS. 1 and 2, the actuator 2-1 includes a casing 90, the wave gear reducer 10, the motor 20, a brake 30, an input encoder 40, an output encoder 50, a torque sensor 60, an input side cover 70, and an output side cover 72. For example, components which are the input side cover 70, the input encoder 40, the brake 30, the motor 20, the wave gear reducer 10, the output encoder 50, the torque sensor 60, and the output side cover 72 are arranged in this order in the casing 90 in the axial direction of the motor shaft 26.

As described later in detail, the motor 20 includes a cylindrical rotor 24 and the wave gear reducer 10 includes the input shaft 104 coaxial with the motor shaft 26 and nested in the rotor 24. In other words, the motor 20 and the wave gear reducer 10 form a nested structure. According to such configuration, since the wave gear reducer 10 and the motor 20 are efficiently arranged in the axial direction of the motor shaft 26, the compact actuator 2-1 may be realized.

Furthermore, for example, as compared with the well-known technology, it is possible to arrange the motor 20 of a larger size with respect to a volume of the actuator 2-1, or a radius of rotation of the motor 20 becomes larger. Therefore, the high output may be realized even when the actuator 2-1 is compact.

Furthermore, in such actuator 2-1, the motor 20 may rotate to generate rotational torque by energization. Furthermore, the wave gear reducer 10 may decelerate the rotational torque output from the motor 20 and output to the torque sensor 60. Furthermore, the torque sensor 60 may measure the rotational torque transmitted from the wave gear reducer 10. Furthermore, in a case where an external part (not illustrated) is coupled to the torque sensor 60, the torque sensor 60 may output the rotational torque to the external part. The configuration of the actuator 2-1 is hereinafter described in more detail.

{2-1-1. Casing 90}

The casing 90 supports, for example, the wave gear reducer 10, a stator 22 of the motor 20 and the like arranged in the casing 90. Furthermore, the casing 90 may be cylindrical. However, the present invention is not limited to such an example, and a shape of the casing 90 may be a prism (such as a quadrangular prism).

{2-1-2. Wave Gear Reducer 10}

The wave gear reducer 10 is an example of a reducer in the present disclosure. The wave gear reducer 10 may have a cylindrical shape. Furthermore, the input shaft 104 and the output shaft 12 included in the wave gear reducer 10 may be coaxial with the motor shaft 26. Note that the input shaft 104 is an example of an input axis in the present disclosure. Furthermore, an output shaft 12 is an example of an output shaft in the present disclosure.

Here, the output shaft 12 may be configured by combining a flex spline 102 and a bracket 120 as described later. For example, as illustrated in FIG. 1, in an opening 122 provided in the bracket 120, a part of the flex spline 102 and the bracket 120 are firmly fastened by a spring pin or the like. However, the output shaft 12 may be only the flex spline 102 or only the bracket 120 without being limited to such an example.

Furthermore, as illustrated in FIGS. 1 and 2, the wave gear reducer 10 is configured by combination of a circular spline 100, the flex spline 102, and the input shaft 104. Specifically, the circular spline 100, the flex spline 102, and the input shaft 104 are arranged in this order from an outside to an inside of the wave gear reducer 10.

(2-1-2-1. Circular Spline 100)

As illustrated in FIG. 1, the circular spline 100 includes a cylindrical first outer peripheral surface 1000 nested in the rotor 24 and a cylindrical second outer peripheral surface 1002 having a larger diameter than that of the first outer peripheral surface 1000. The second outer peripheral surface 1002 is fixed to (supported by) an inner wall of the casing 90. Furthermore, the circular spline 100 further includes at least another outer peripheral surface 1004 adjacent to the first outer peripheral surface 1000 and the second outer peripheral surface 1002.

Furthermore, teeth (hereinafter, referred to as inner peripheral teeth) are cut on an inner periphery of the circular spline 100. A pitch of the inner peripheral teeth is the same as a pitch of teeth (hereinafter referred to as outer peripheral teeth) cut in an outer periphery of the flex spline 102. Furthermore, the number of the inner peripheral teeth is larger than the number of the outer peripheral teeth of the flex spline 102 by a predetermined number (for example, two). Furthermore, the inner peripheral teeth and the outer peripheral teeth of the flex spline 102 are arranged to mesh with each other.

Furthermore, as illustrated in FIG. 1, a cross roller bearing 14 is fixed to an inner peripheral surface 1006 facing the second outer peripheral surface 1002. The cross roller bearing 14 rotatably supports the output shaft 12. Note that the cross roller bearing 14 is an example of a first bearing in the present disclosure.

For example, the inner peripheral surface 1006 may be fixed to an outer ring 140 of the cross roller bearing 14. More specifically, the outer ring 140 is pre-pressurized by the inner peripheral surface 1006 and an outer lock ring 180. Furthermore, an inner ring 142 of the cross roller bearing 14 is pre-pressurized by the bracket 120 and an inner lock ring 182. By using the cross roller bearing 14 in this manner, it is possible to receive a moment load of other than the motor shaft 26, smooth torque transmission may be realized. Note that a ball bearing may also be used in place of the cross roller bearing 14.

(2-1-2-2. Flex Spline 102)

The flex spline 102 is a cup-shaped metal elastic body. Furthermore, the flex spline 102 is fixed to the input shaft 104.

Furthermore, as illustrated in FIG. 1, a bearing 16 may be fixed to an inside of the flex spline 102 (for example, inside a base). The bearing 16 rotatably supports the motor shaft 26. Here, the bearing 16 is an example of a second bearing in the present disclosure.

Furthermore, as illustrated in FIGS. 1, 2, 3A, and 3B, the flex spline 102 may be fixed to the torque sensor 60 by a screw (for example, a bolt or the like).

(2-1-2-3. Input Shaft 104)

As illustrated in FIGS. 1 and 2, the input shaft 104 is formed by combination of an oval portion 106 and a bearing 108. The input shaft 104 is fitted into the flex spline 102. Furthermore, the oval portion 106 has an oval shape. Furthermore, the oval portion 106 may be fixed to the motor shaft 26. According to such configuration, when the rotor 24 of the motor 20 rotates, the input shaft 104 rotates in synchronization with the rotor 24. Then, the flex spline 102 rotates in a state in which the inner peripheral teeth of the circular spline 100 and the outer peripheral teeth of the flex spline 102 mesh in two sites in a longitudinal direction of the oval while being bent in an oval shape (while being elastically deformed) according to the rotation of the input shaft 104. As a result, the flex spline 102 is decelerated relative to the input shaft 104 to rotate, then the output shaft 12 rotates at the reduced speed. Moreover, the torque according to the rotation of the output shaft 12 is transmitted to the torque sensor 60 via the output shaft 12.

{2-1-3. Motor 20}

The motor 20 is driven by the energization and generates the rotational torque. The motor 20 may be a brushless motor. Furthermore, as illustrated in FIGS. 1 and 2, the motor 20 includes the stator 22, the rotor 24, and the motor shaft 26. Combination of the stator 22 and the rotor 24 may form a motor magnetic circuit. For example, when three-phase alternating current is supplied to the stator 22, a rotational magnetic field is generated between the stator 22 and a plurality of motor magnets 242 (included in the rotor 24) to generate the rotational torque.

(2-1-3-1. Stator 22)

As illustrated in FIG. 1, the stator 22 is fixed to the inner wall of the casing 90. Furthermore, as illustrated in FIGS. 1 and 2, the stator 22 includes a stack core 220 and a motor coil 222. For example, an outer peripheral surface of the stack core 220 is fixed to the inner wall of the casing 90. Furthermore, the motor coil 222 is fixed to an inner peripheral surface of the stack core 220.

(2-1-3-2. Rotor 24)

The rotor 24 has the cylindrical shape and is arranged so as to involve the first outer peripheral surface 1000 of the circular spline 100. Furthermore, the rotor 24 includes a motor yoke 240 and the plurality of motor magnets 242.

For example, as illustrated in FIGS. 1 and 3A, in the motor yoke 240, a support 2420 which includes a plane orthogonal to an extending direction of the rotor 24 and supports the motor shaft 26. For example, the support 2420 is fixed to the input shaft 104.

Furthermore, the motor magnet 242 may be a permanent magnet. Furthermore, as illustrated in FIGS. 2 and 3A, the plurality of motor magnets 242 is installed on an outer peripheral surface of the motor yoke 240 at regular intervals, for example. Here, the number of poles of the plurality of motor magnets 242 is, for example, eight or larger. Note that, cogging torque preferably becomes smaller as the number of poles is larger.

According to the above-described configuration, the motor magnet 242 having a larger size (compared to that in the well-known technology) may be arranged in the casing 90 without changing the structure of the wave gear reducer 10. Furthermore, since it is also possible to adopt the motor magnets 242 of different sizes for respective application scenes of the actuator 2-1, various motor outputs may be realized. For example, in a serial robot arm, a self-weight of each joint is different in general, so that required holding torque may also be different. Therefore, an appropriate output may be realized for each joint by appropriately changing a motor magnetic circuit unit (for example, the size of the motor magnet 242 or the like) for each joint.

(2-1-3-3. Motor Shaft 26)

The motor shaft 26 is the rotational shaft of the motor 20. As illustrated in FIG. 1, the motor shaft 26 may be rotatably supported around the central axis X by the bearing 16 and a bearing 38 as described later. Here, as described above, the bearing 16 may be installed inside the base of the flex spline 102. Furthermore, as illustrated in FIG. 1, the bearing 38 may be installed at substantially the center of the main body 32 of the brake 30. That is, a distance between the two bearings (bearing 16 and bearing 38) supporting the motor shaft 26 is large. As a result, for example, shaking of the motor shaft 26 at the time of driving of the motor 20 may be suppressed. Furthermore, since the bearing 16 and the bearing 38 are installed in vacant spaces, respectively, the actuator 2-1 may be made more compact.

Furthermore, the motor shaft 26 may be hollow. Furthermore, as illustrated in FIGS. 1 and 2, a hollow tube 80 as described later may be arranged inside the motor shaft 26.

{2-1-4. Brake 30}

The brake 30 is a mechanism for stopping rotation of the rotor 24. The brake 30 may be a non-excitation type brake. Furthermore, the brake 30 is arranged on a side opposite to the wave gear reducer 10 with respect to the motor 20. That is, the brake 30 is arranged in a position before the deceleration by the wave gear reducer 10. According to such configuration, brake torque necessary for stopping the rotation of the rotor 24 may be reduced by a reduction ratio of the wave gear reducer 10. Therefore, since a mechanism of the brake 30 may be made compact, the actuator 2-1 may be made more compact. Furthermore, for a similar reason, a dead zone (backlash) of the brake 30 may also be reduced by the reduction ratio of the wave gear reducer 10.

Hereinafter, a configuration of the brake 30 is described in detail. The brake 30 includes a main body 32, a rotating portion 34, a mover 36, and an elastic member (not illustrated).

(2-1-4-1. Rotating Portion 34)

The rotating portion 34 may be located farther than the main body 32 with reference to a position of the motor 20. Furthermore, the rotating portion 34 may be fixed to the input shaft 104 and be coaxial with the motor shaft 26. For example, the rotating portion 34 is fixed to one end of the input shaft 104. As a result, the rotating portion 34 rotates in synchronization with the rotor 24.

Furthermore, as described later, an input encoder disk 44 may be fixed to the rotating portion 34. According to such configuration, when coaxiality of the rotor 24, the rotational shaft of the wave gear reducer 10, and the brake 30 is set with high accuracy, measurement accuracy by the input encoder 40 may be improved, and smooth torque transmission may be realized.

(2-1-4-2. Mover 36)

The mover 36 is arranged in a space between the main body 32 and the rotating portion 34. The mover 36 may be an armature.

(2-1-4-3. Elastic Member)

The elastic member may be fixed to the main body 32 and the mover 36. The elastic member is configured to apply elastic force toward the rotating portion 34 to the mover 36. For example, when an electromagnet 320 as described later is not energized, the mover 36 is pressed against the rotating portion 34 by the elastic member. As a result, friction between a contact surface of the rotating portion 34 and a contact surface of the mover 36 generates brake torque (friction torque), then the rotation of the rotating portion 34 is stopped by the brake torque. As a result, the rotation of the rotor 24 (coupled to the rotating portion 34 via the input shaft 104, for example) is stopped.

Note that, the elastic member is, for example, a compression coil spring.

(2-1-4-4. Main Body 32)

As illustrated in FIG. 2, the electromagnet 320 is fixed to the main body 32. The electromagnet 320 attracts the mover 36 toward the main body 32 in accordance with an energizing status. For example, while the electromagnet 320 is energized (at the time of energization), the electromagnet 320 attracts the mover 36 toward the main body 32. As a result, the brake torque is released, then the rotating portion 34 becomes rotatable. As a result, the rotor 24 also becomes rotatable.

Furthermore, while the electromagnet 320 is not energized (at the time of non-energization), the electromagnet 320 does not attract the mover 36 toward the main body 32.

Furthermore, as illustrated in FIG. 1, the bearing 38 may be fixed to substantial the center of the main body 32. The bearing 38 rotatably supports the motor shaft 26. Here, the bearing 38 is an example of a third bearing in the present disclosure.

Furthermore, the main body 32 may support the wave gear reducer 10 by being arranged so as to be pressed against a side surface of the wave gear reducer 10. Furthermore, as illustrated in FIG. 1, the casing 90 and the main body 32 may be fixed, for example, by an inlay structure. As a result, the coaxiality of the rotor 24, the rotational shaft of the wave gear reducer 10, and the brake 30 may be easily increased.

{2-1-5. Input Encoder 40}

The input encoder 40 is an example of a first encoder in the present disclosure. The input encoder 40 is arranged on the input side of the actuator 2-1, and measures a rotational angle of the rotor 24. For example, the input encoder 40 is an absolute encoder, and measures an absolute rotational angle of the rotor 24. As a result, for example, a host (not illustrated) which controls the actuator 2-1 may change the output of the motor 20 in real time on the basis of a measurement result of the rotational angle of the rotor 24 by the input encoder 40.

Furthermore, as illustrated in FIG. 2, the input encoder 40 includes an input encoder substrate 42 and a disk-shaped input encoder disk 44.

Figure 4A:
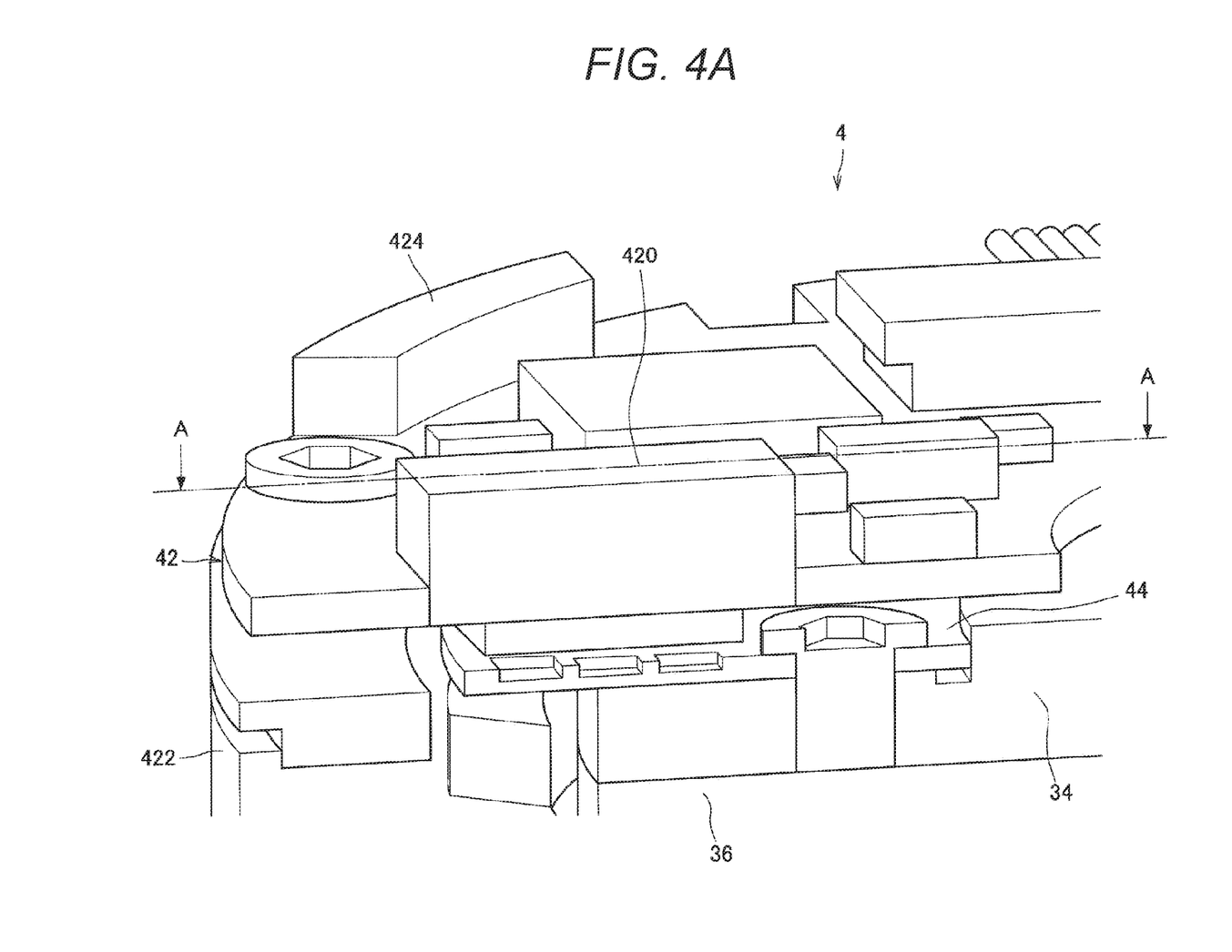
FIG. 4A is an enlarged view of a region 4 illustrated in FIG. 1.
Figure 4B:
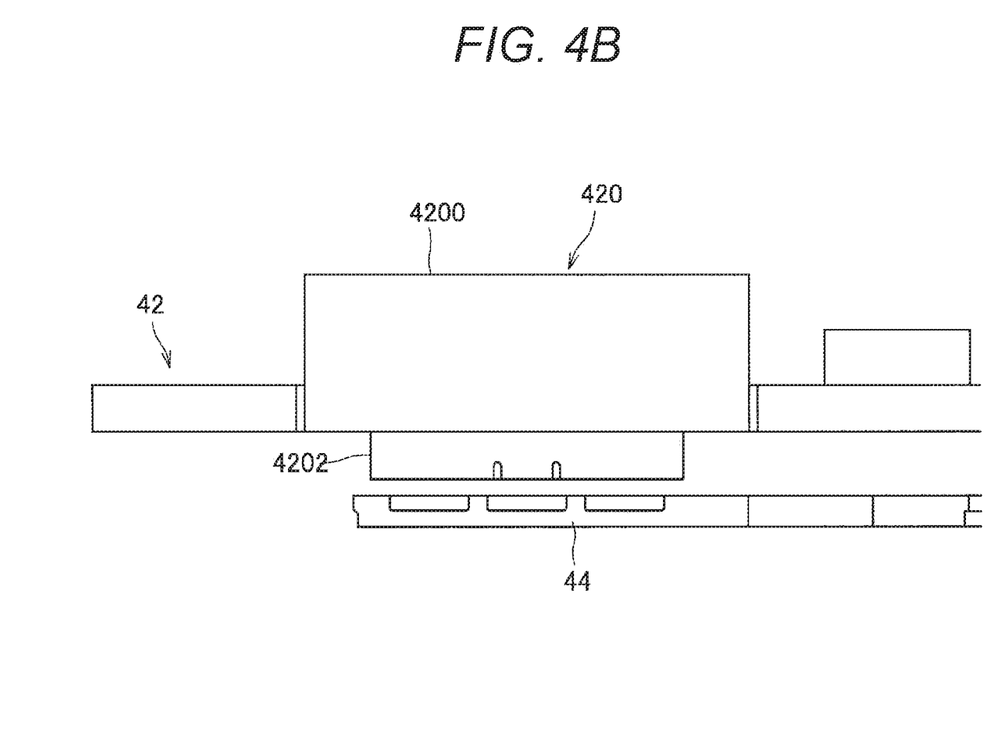
FIG. 4B is a view schematically illustrating a cross-section taken along line A-A in FIG. 4A.

Hereinafter, a configuration of the input encoder 40 is described in further detail with reference to FIGS. 4A and 4B. FIG. 4A is an enlarged view of a region 4 illustrated in FIG. 1. Furthermore, FIG. 4B is a view schematically illustrating a cross-section taken along line A-A in FIG. 4A.

(2-1-5-1. Input Encoder Substrate 42)

As illustrated in FIG. 4A, a magnetic field measuring element 420 is installed on the input encoder substrate 42. For example, as illustrated in FIG. 4B, the magnetic field measuring element 420 is configured by combination of a permanent magnet 4200 and a Hall integrated circuit (IC) 4202.

Note that, for example, as illustrated in FIG. 2, an input encoder holder 424 may be fixed to the input encoder substrate 42. Then, the input encoder holder 424 and an input encoder bracket 422 fixed to the main body 32 of the brake 30 may be fixed, for example, by the inlay structure. Note that the input encoder bracket 422 may be fixed to the main body 32 with, for example, a jig or the like so as to be coaxial with the main body 32.

(2-1-5-2. Input Encoder Disk 44)

The input encoder disk 44 may be a magnetic disk. For example, the input encoder disk 44 is a magnetic body provided with a plurality of slits of a predetermined pattern. Furthermore, as illustrated in FIG. 3A, the input encoder disk 44 may be fixed to the rotating portion 34 of the brake 30. According to such configuration, when the input encoder disk 44 rotates according to the rotation of the rotating portion 34, the input encoder disk 44 (provided with the slits) crosses a biased magnetic field generated by the permanent magnet 4200, so that magnetic flux density measured by the magnetic field measuring element 420 (more specifically, the Hall IC 4202) may change. In this case, the magnetic field measuring element 420 measures the absolute rotational angle of the rotor 24 by measuring the change of the magnetic flux density.

Figure 5:
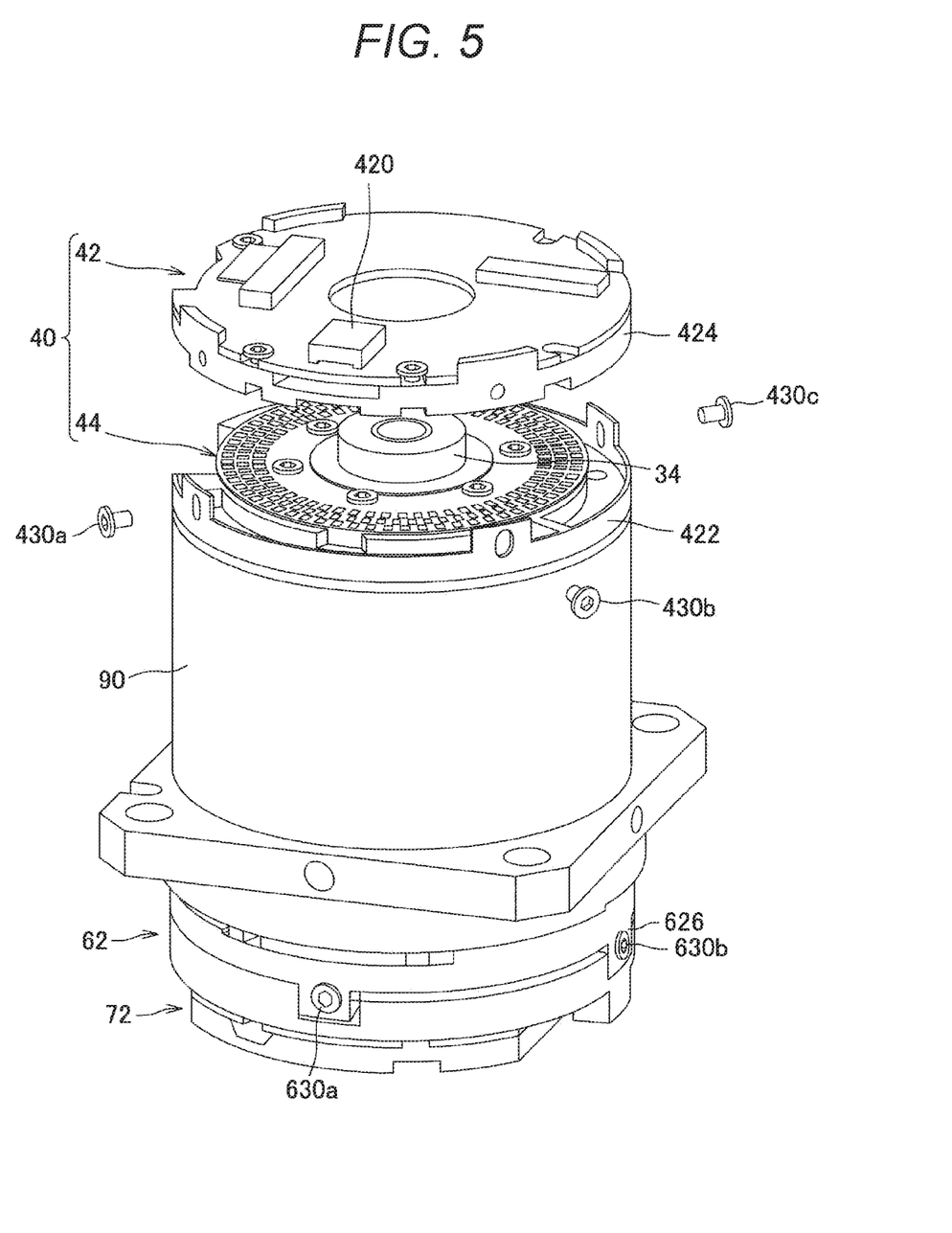
FIG. 5 is an illustrative view illustrating an example of a mechanism for adjusting a distance between an input encoder substrate 42 and an input encoder disk 44.

Note that, in order for the magnetic field measuring element 420 to measure the rotational angle with high accuracy, a distance between the input encoder disk 44 and the magnetic field measuring element 420 needs to be strictly adjusted. Therefore, as illustrated in FIG. 5, the input encoder holder 424 and the input encoder bracket 422 may be configured to be fixable with screws 430 in the axial direction of the motor shaft 26, for example, at four points on the outer periphery. That is, it is possible to configure such that a distance between the input encoder holder 424 and the input encoder bracket 422 is adjustable in the axial direction of the motor shaft 26. Furthermore, as described above, the input encoder holder 424 and the input encoder bracket 422 may be fixed by the inlay structure. According to the above-described configuration, a user may easily and strictly adjust a distance between the input encoder substrate 42 and the input encoder disk 44 by using, for example, a general tool even after assembling the entire actuator 2-1.

{2-1-6. Output Encoder 50}

The output encoder 50 is an example of a second encoder in the present disclosure. The output encoder 50 is arranged on the output side of the actuator 2-1, and measures a rotational angle of the output shaft 12. For example, the output encoder 50 is arranged between the torque sensor 60 and the casing 90. Furthermore, the output encoder 50 is an absolute encoder, and measures an absolute rotational angle of the output shaft 12. Furthermore, as illustrated in FIG. 2, the output encoder 50 includes an output encoder substrate 52 and a disk-shaped output encoder disk 54.

(2-1-6-1. Output Encoder Substrate 52)

A magnetic field measuring element 520 may be installed on the output encoder substrate 52. For example, the magnetic field measuring element 520 is configured by combination of a permanent magnet 5200 and a Hall integrated circuit (IC) 5202. Furthermore, the magnetic field measuring element 520 may be the same element as the magnetic field measuring element 420.

Note that, for example, as illustrated in FIG. 3B, an output substrate holder 626 may be fixed to the output encoder substrate 52. Then, the output substrate holder 626 and a torque sensor distortion body 62 as described later may be fixed by, for example, the inlay structure.

(2-1-6-2. Output Encoder Disk 54)

The output encoder disk 54 may be a magnetic disk. For example, the output encoder disk 54 is a magnetic body provided with a plurality of slits of a predetermined pattern. Note that the output encoder disk 54 may be the same disk as the input encoder disk 44.

Furthermore, as illustrated in FIG. 1, the output encoder disk 54 may be fixed to the casing 90 (for example, a groove provided in the casing 90 or the like). According to such a configuration, the torque sensor distortion body 62 rotates according to the rotation of the output shaft 12 of the wave gear reducer 10, and then the output encoder substrate 52 rotates according to the rotation of the torque sensor distortion body 62, therefore, the output encoder disk 54 (provided with slits) crosses a biased magnetic field generated by the permanent magnet 5200 (included in the magnetic field measuring element 520), so that the magnetic flux density measured by the magnetic field measuring element 520 (more specifically, the Hall IC 5202) may change. In this case, the magnetic field measuring element 520 measures the absolute rotational angle of the output shaft 12 by measuring the change of the magnetic flux density.

Note that, as illustrated in FIG. 5, the output substrate holder 626 and the torque sensor distortion body 62 may be configured to be fixable with screws 630 in the axial direction of the motor shaft 26, for example, at four points on the outer periphery. That is, it is possible to configure such that a distance between the output substrate holder 626 and the torque sensor distortion body 62 is adjustable in the axial direction of the motor shaft 26. Furthermore, as described above, the output substrate holder 626 and the torque sensor distortion body 62 may be fixed by the inlay structure. According to the above-described configuration, the user may easily and strictly adjust a distance between the output encoder substrate 52 and the output encoder disk 54 by using, for example, a general tool even after assembling the entire actuator 2-1 (as is the case with the input encoder 42). As a result, the output encoder 50 may measure the absolute rotational angle of the output shaft 12 with high accuracy.

(2-1-6-3. Variation)

Note that, in the description above, although the example in which the input encoder 40 and the output encoder 50 are the magnetic encoders is described, the present invention is not limited to this example. For example, the input encoder 40 and/or the output encoder 50 may be an optical encoder.

{2-1-7. Torque Sensor 60}

A torque sensor 60 is fixed to an output shaft 12 (of a wave gear reducer 10) and measures torque according to rotation of the output shaft 12. Furthermore, the torque sensor 60 includes a torque sensor distortion body 62 and a torque sensor substrate 64.

(2-1-7-1. Torque Sensor Distortion Body 62)

As illustrated in FIG. 2, the torque sensor distortion body 62 includes a first rotating body 620 fixed to the output shaft 12, a second rotating body 624, and a plurality of distortion parts 622 fixed to the first rotating body 620 and the second rotating body 624. In a case where rotational torque is input to the first rotating body 620, each of the plurality of distortion parts 622 may transmit the rotational torque to the second rotating body 624 while causing strain, for example.

(2-1-7-2. Torque Sensor Substrate 64)

The torque sensor substrate 64 is an example of a measuring unit in the present disclosure. The torque sensor substrate 64 measures the rotational torque in accordance with a detection result of the strain generated in each of the plurality of distortion parts 622. For example, a strain gauge (not illustrated) is installed in each of the plurality of distortion parts 622. In this case, the strain gauge installed in each of the distortion parts 622 detects the strain generated in the distortion part 622. Then, the torque sensor substrate 64 measures the input rotational torque in accordance with the detection result of the strain generated in each distortion part 622.

Note that, in a case where the torque sensor 60 receives external force also, the external force is transmitted to inside the actuator 2-1 (wave gear reducer 10 or the like) via the distortion part 622. Therefore, the torque sensor substrate 64 may correctly measure the torque corresponding to the external force according to the detection result of the strain generated in the distortion part 622. Furthermore, the measurement result by the torque sensor 60 may be transmitted to the host via a cable (for example, a coaxial cable 82) connected to the torque sensor 60 and arranged in the hollow tube 80. In this case, the host may appropriately adjust (feedback) the value of the three-phase alternating current supplied to the stator 22 according to the received measurement result. As a result, the actuator 2-1 may output target torque even in a case of receiving the external force.

Note that the torque sensor 60 may be, for example, a magnetostrictive type, a capacitive type, a semiconductor strain gauge type, a general-purpose strain gauge type, or the like.

{2-1-8. Hollow Tube 80}

The hollow tube 80 is arranged inside the motor shaft 26. Furthermore, the hollow tube 80 may be supported by the input side cover 70 and the output side cover 72. For example, bearings installed on the input side cover 70 and the output side cover 72 may support the hollow tube 80. Alternatively, the input side cover 70 and the output side cover 72 may be formed by using a resin material with small sliding resistance such as polyacetal (POM) resin, for example, and the hollow tube 80 may be metallic. In this case, since friction generated when the input side cover 70 and the output side cover 72 support the hollow tube 80 becomes very small, an effect similar to that with the bearing may be realized. Furthermore, the actuator 2-1 may be made more compact in the axial direction of the motor shaft 26.

Furthermore, the coaxial cable 82 may be arranged inside the hollow tube 80. Here, the coaxial cable 82 may include, for example, a cable connecting the input encoder 40 and the output encoder 50, a cable connecting each of the input encoder 40, the output encoder 50, and the torque sensor 60 to an external device (such as a host or a power supply), and the like. As an example, at least one power supply line for supplying power to the input encoder 40, the output encoder 50, and the torque sensor 60 is arranged inside the hollow tube 80. Furthermore, at least one signal line for transmitting a signal between each of the input encoder 40, the output encoder 50, and the torque sensor 60 and an external device (such as the host) is arranged inside the hollow tube 80.

Note that the inside of the motor shaft 26 has the smallest radius of rotation (in the actuator 2-1), and no other parts is present inside the motor shaft 26. Therefore, as described above, by arranging the hollow tube 80 inside the motor shaft 26, the wiring may be simplified, and multiple rotations of the motor 20 may be realized. For example, a clearance in the motor shaft 26 may be kept constant. Furthermore, since the motor shaft 26 and the cable do not come in contact with each other, useless friction torque is not generated inside the actuator 2-1. Furthermore, for example, each of the input encoder 40, the output encoder 50, and the torque sensor 60 may be connected to the host by one cable.

<2-2. Effect>

{2-2-1. Effect 1}

As described above, the actuator 2-1 according to the first embodiment is provided with the motor 20 including the cylindrical rotor 24 and the wave gear reducer 10 including the input shaft 104 coaxial with the motor shaft 26 and nested in the rotor 24. Therefore, the high output may be realized even when the actuator 2-1 is compact.

For example, as compared with the well-known technology, it is possible to arrange the motor 20 of a larger size with respect to the volume of the actuator 2-1 (for example, the motor magnet 242 and the like), or the radius of rotation of the motor 20 becomes larger. Therefore, since the generated magnetic flux density is increased, the high output is possible even when the actuator 2-1 is compact.

{2-2-2. Effect 2}

Furthermore, the actuator 2-1 is provided with the non-excitation type brake 30. Therefore, the output of the actuator 2-1 may be safely stopped in an emergency (for example, when the power is shut off).

{2-2-3. Effect 3}

Furthermore, the input encoder 40 or the output encoder 50 may be arranged in positions before and after the deceleration of the wave gear reducer 10, and the input encoder 40 and the output encoder 50 may be absolute encoders. Therefore, a relationship between the absolute angle on the input side of the actuator 2-1 and the absolute angle on the output side of the actuator 2-1 may always be measured.

For example, even when the output side of the actuator 2-1 moves due to an effect of the external force or the like when the power is stopped, the relationship between the absolute angle on the input side of the actuator 2-1 and the absolute angle on the output side of the actuator 2-1 may be immediately grasped when the power is turned on. Therefore, zero return operation at the time of power on becomes unnecessary.

{2-2-4. Effect 4}

Furthermore, the torque sensor 60 may be fixed to the output shaft 12 of the wave gear reducer 10. Therefore, it is possible to measure the output torque in real time. For example, in a case where the actuator 2-1 is mounted on a joint of a robot arm, it becomes possible to give a torque command while sensing the torque in all parts of the robot arm. Therefore, safe arm work may be realized even in the same environment as that of human or in a complicated work environment.

{2-2-5. Effect 5}

Furthermore, according to the first embodiment, each element part (for example, the wave gear reducer 10, the brake 30, the input encoder 40, the output encoder 50, the torque sensor 60, and the like) may be arranged compactly in the axial direction of the motor shaft 26. Therefore, for example, as illustrated in FIG. 1, the cross-sectional shape of the actuator 2-1 becomes a shape close to a square. Therefore, when the actuators 2-1 are mounted on various robot systems, arrangement restrictions of the actuators 2-1 are relaxed, so that the actuators 2-1 may be installed at various places in the robot system. For example, in a case where the actuator 2-1 is mounted on the joint of the robot arm, there is no useless protrusion as compared with the well-known technology. Therefore, a more compact and light-weight robot arm may be realized.

{2-2-6. Effect 6}

Furthermore, according to the first embodiment, useless parts are not placed between the motor 20 and the wave gear reducer 10, between the wave gear reducer 10 and the brake 30, and between the brake 30 and the input encoder 40. For example, the actuator 2-1 is configured by assembling all other parts for one part. For this reason, variation in coaxiality may be reduced. Therefore, ideal gear meshing may be realized, and smooth torque transmission may be realized. For example, an actuator with less torque ripple may be realized.

{2-2-7. Effect 7}

Furthermore, according to the first embodiment, the parts interposed between the element parts (wave gear reduction gear 10, motor 20, brake 30, input encoder 40, output encoder 50, torque sensor 60 and the like) may be shared or reduced. For this reason, the actuator 2-1 may be configured using fewer parts as compared to those in the well-known technology. Therefore, an actuator with lower manufacturing cost and lighter weight may be realized. Moreover, there are advantages such as reduction in noise when driving the motor 20, for example, reduction of magnetical influence to the outside (leakage magnetic flux and the like), and prevention of environmental debris from entering the brake pads.

{2-2-8. Effect 8}

Furthermore, all the element parts may be incorporated in the actuator 2-1. That is, since each element part is unitized, it is easy to mount in various robot systems.

3. SECOND EMBODIMENT

Figure 6:
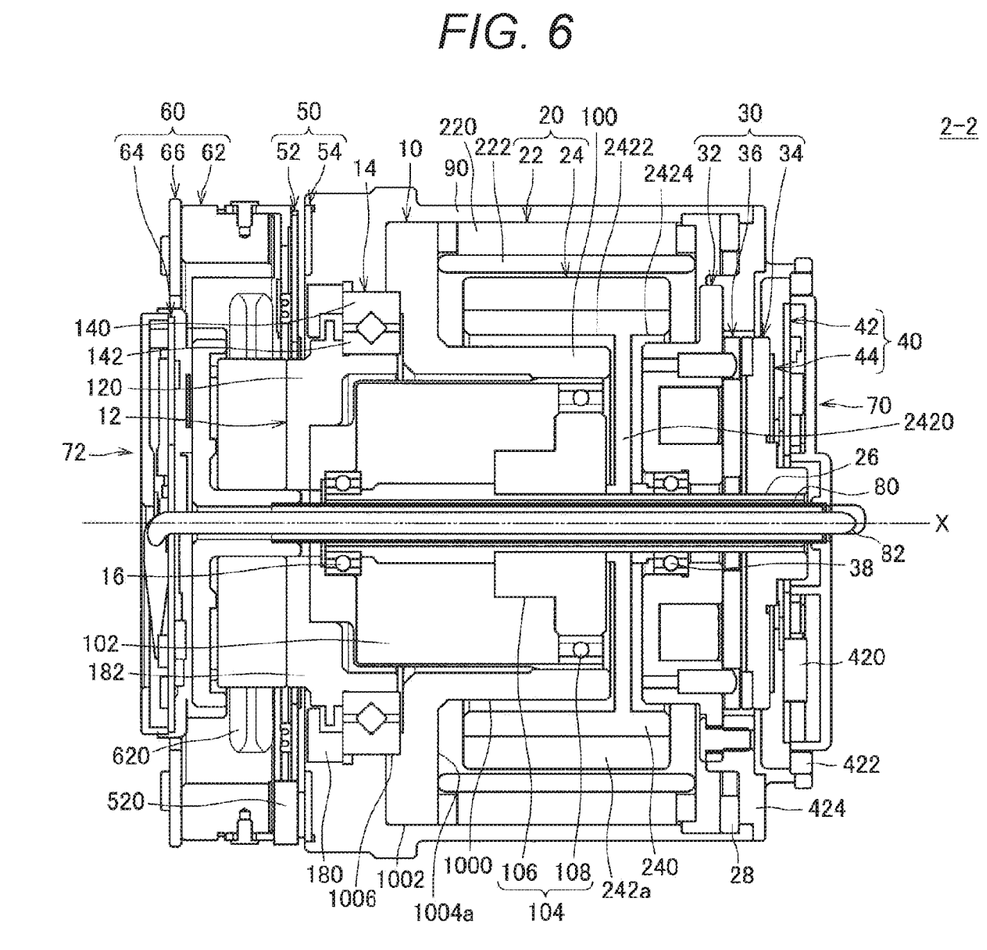
FIG. 6 is a cross-sectional view of an actuator 2-2 according to a second embodiment of the present disclosure.
Figure 7:
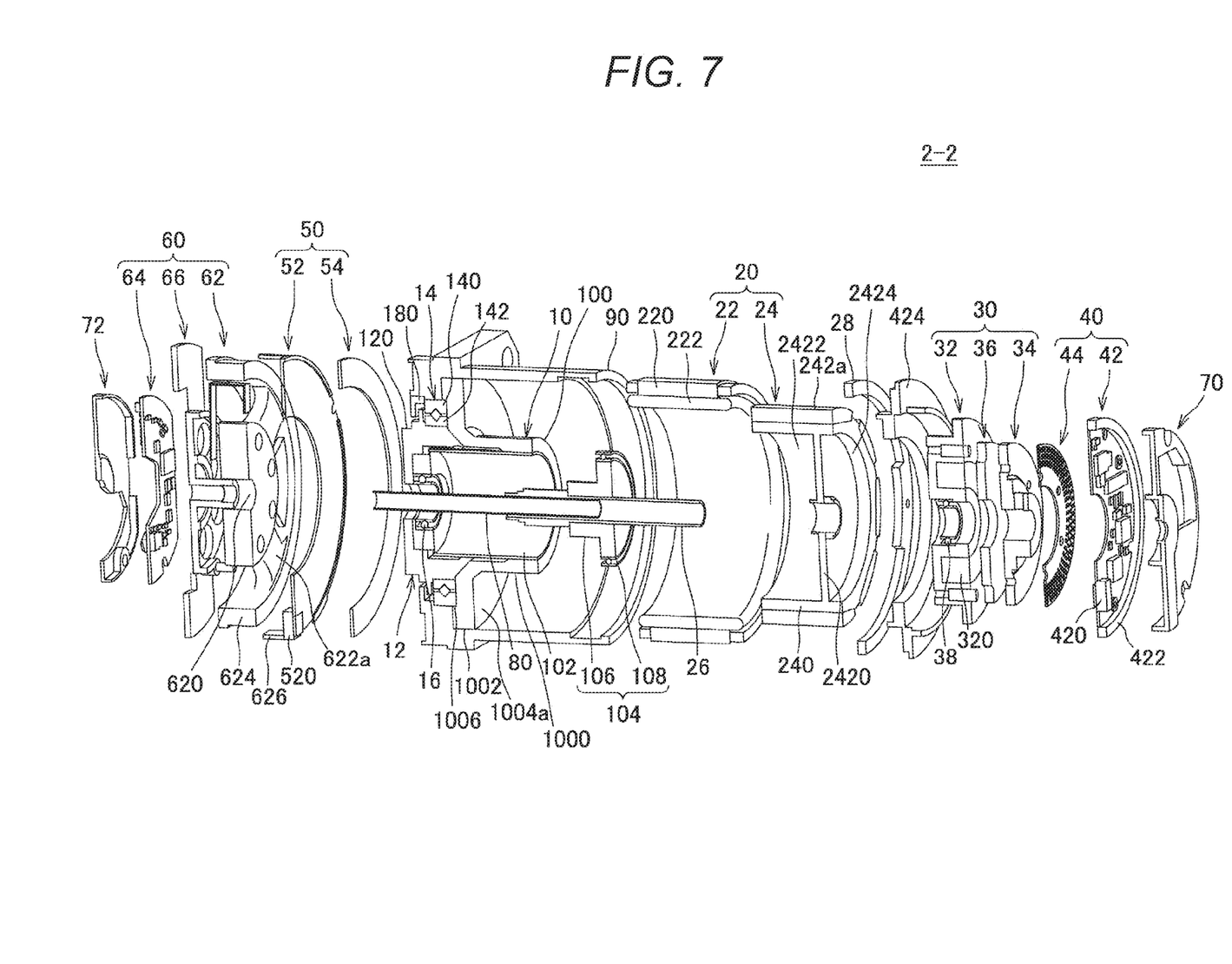
FIG. 7 is an exploded perspective view of the actuator 2-2.

The first embodiment is described above. Next, a configuration of an actuator 2-2 according to a second embodiment is described. FIG. 6 is a view illustrating a cross-section of the actuator 2-2. More specifically, FIG. 6 is a view illustrating the cross-section of the actuator 2-2 cut along a plane passing through a central axis X of a motor shaft 26 and orthogonal to an axial direction of the motor shaft 26. Furthermore, FIG. 7 is an exploded perspective view illustrating a configuration of the actuator 2-2. Note that, hereinafter, the description of the same contents as those of the first embodiment is omitted, and only the contents different from those of the first embodiment is described.

<3-1. Wave Gear Reducer 10>

As illustrated in FIGS. 6 and 7, in the actuator 2-2 according to the second embodiment, a wave gear reducer 10 larger than that in the actuator 2-1 according to the first embodiment is arranged. This enables a higher output.

<3-2. Brake 30>

Furthermore, as illustrated in FIG. 6, a part of a main body 32 of a brake 30 according to the second embodiment is nested in a rotor 24. For example, as illustrated in FIG. 6, the wave gear reducer 10 is nested in the rotor 24 on a first side of the rotor 24 with a support 2420 as a boundary. Furthermore, on a second side opposite to the first side with the support 2420 as the boundary, a part of the main body 32 is nested in the rotor 24. In other words, the brake 30 and the wave gear reducer 10 form a nested structure.

According to such configuration, the actuator 2-2 may be made more compact (thinner) in the axial direction of the motor shaft 26.

4. CONCLUSION

Although the preferred embodiments of the present disclosure are described above in detail with reference to the attached drawings, the present disclosure is not limited to such examples. It is clear that one of ordinary skill in the field of the technology to which the present disclosure belongs may conceive of various modifications and corrections within the scope of the technical idea recited in claims and it is understood that they also naturally belong to the technical scope of the present disclosure.

Furthermore, the effects described in this specification are merely illustrative or exemplary, and are not limitative. That is, the technology according to the present disclosure may exhibit other effects obvious to those skilled in the art from the description of this specification together with or in place of the above-described effects.

Note that, the following configuration also belongs to the technical scope of the present disclosure.

(1)
An actuator provided with:
a motor including a cylindrical rotor; and
a reducer including an input shaft coaxial with a rotational shaft of the motor and nested in the rotor.

(2)
The actuator according to (1) described above,
in which the reducer has a cylindrical shape, and
the reducer further includes an output shaft coaxial with the rotational shaft of the motor.

(3)
The actuator according to (2) described above,
in which the motor further includes a stator, and
the actuator is further provided with a casing supporting the reducer and the stator.

(4)
The actuator according to (3) described above,
in which the reducer includes
a cylindrical first outer peripheral surface nested in the rotor, and
a cylindrical second outer peripheral surface having a diameter larger than a diameter of the first outer peripheral surface,
the second outer peripheral surface supported by the casing.

(5)
The actuator according to (4) described above, further provided with:
a first bearing supported by an inner peripheral surface facing the second outer peripheral surface and rotatably supporting the output shaft.

(6)
The actuator according to (4) or (5) described above, in which the reducer includes a wave gear reducer.

(7)
The actuator according to (6) described above, in which the wave gear reducer includes
a flex spline being a part of the output shaft.

(8)
The actuator according to (7) described above, further provided with:
a second bearing supported inside the flex spline and rotatably supporting the rotational shaft of the motor.

(9)
The actuator according to any one of (3) to (8) described above, further provided with:
a brake arranged on a side opposite to the reducer with respect to the motor,
in which the brake includes
a fixed main body, and
a rotating portion coaxial with the rotational shaft of the motor.

(10)
The actuator according to (9) described above, further provided with:
a third bearing supported by the main body and rotatably supporting the rotational shaft of the motor.

(11)
The actuator according to (9) or (10) described above,
in which the brake further includes
a mover located between the main body and the rotating portion,
an elastic member configured to apply elastic force toward the rotating portion to the mover, the elastic member fixed to the main body, and
an electromagnet which attracts the mover toward the main body at the time of energization.

(12)
The actuator according to any one of (9) to (11),
in which a part of the main body is nested in the rotor.

(13)
The actuator according to (12) described above,
in which the rotor includes a support including a plane orthogonal to an extending direction of the rotor and supporting the rotational shaft of the motor,
the reducer is nested in the rotor on a first side of the rotor with the support as a boundary, and
a part of the main body is nested in the rotor on a second side opposite to the first side with the support as the boundary.

(14)
The actuator according to any one of (2) to (13) described above, further provided with:
a torque sensor fixed to the output shaft and measuring torque according to rotation of the output shaft.

(15)
The actuator according to (14) described above,
in which the torque sensor includes
a first rotating body fixed to the output shaft,
a second rotating body,
a distortion part fixed to the first rotating body and the second rotating body and transmitting rotational torque while causing strain between the first rotating body and the second rotating body, and
a measuring unit which measures the rotational torque according to the strain of the distortion part.

(16)
The actuator according to (14) or (15) described above,
in which the rotational shaft of the motor is hollow, and
a cable for connecting the torque sensor to an external device is arranged inside the rotational shaft of the motor.

(17)

The actuator according to any one of (9) to (13), further provided with:

a first encoder for measuring a rotational angle of the rotor; and a second encoder for measuring a rotational angle of the output shaft.

(18)

The actuator according to (17) described above, further provided with:

a torque sensor fixed to the output shaft and measuring torque according to rotation of the output shaft, in which the first encoder is arranged on a side on which the brake is located with respect to the motor, and the second encoder is arranged between the torque sensor and the casing.

(19)

The actuator according to (17) or (18) described above, in which the rotational shaft of the motor is hollow, and a cable for connecting the first encoder to the second encoder is arranged inside the rotational shaft of the motor.

REFERENCE SIGNS LIST 2-1, 2-2 Actuator
10 Wave gear reducer
12 Output shaft
14 Cross roller bearing
16, 38, 108 Bearing
20 Motor
22 Stator
24 Rotor
26 Motor shaft
30 Brake
32 Main body
34 Rotating portion
36 Mover
40 Input encoder
42 Input encoder substrate
44 Input encoder disk
50 Output encoder
52 Output encoder substrate
54 Output encoder disk
60 Torque sensor
62 Torque sensor distortion body
64 Torque sensor substrate
70 Input side cover
72 Output side cover
80 Hollow tube
90 Casing
100 Circular spline
102 Flex spline
104 Input shaft
106 Oval portion
120 Bracket
220 Stack core
222 Motor coil
240 Motor yoke
242 Motor magnet
320 Electromagnet
420, 520 Magnetic field measuring element
422 Input encoder bracket
424 Input encoder holder
430, 630 Screw
620 First rotating body
622 Distortion part
624 Second rotating body
626 Output substrate holder
1000 First outer peripheral surface
1002 Second outer peripheral surface
1006 Inner peripheral surface
2420 Support

The invention claimed is:

1. An actuator, comprising:
a motor that includes a cylindrical rotor;
a reducer that includes:
an input shaft coaxial with a rotational shaft of the motor, wherein the input shaft is nested in the cylindrical rotor;
an output shaft coaxial with the rotational shaft of the motor;
a cylindrical first outer peripheral surface nested in the cylindrical rotor; and
a cylindrical second outer peripheral surface, wherein a diameter of the cylindrical second outer peripheral surface is larger than a diameter of the cylindrical first outer peripheral surface;
a casing configured to support the cylindrical second outer peripheral surface of the reducer;
a torque sensor fixed to the output shaft, wherein the torque sensor is configured to measure torque based on rotation of the output shaft; and
a first encoder configured to measure a rotational angle of the output shaft, wherein the first encoder is between the torque sensor and the casing.

2. The actuator according to claim 1, wherein the reducer has a cylindrical shape.

3. The actuator according to claim 2, wherein
the motor further includes a stator, and
the casing is further configured to support the stator.

4. The actuator according to claim 3, further comprising a first bearing supported by an inner peripheral surface of the reducer, wherein
the inner peripheral surface faces the cylindrical second outer peripheral surface, and
the first bearing is configured to rotatably support the output shaft.

5. The actuator according to claim 3, wherein the reducer is a wave gear reducer.

6. The actuator according to claim 3, wherein the output shaft includes a flex spline.

7. The actuator according to claim 6, further comprising a second bearing supported inside the flex spline, wherein the second bearing is configured to rotatably support the rotational shaft of the motor.

8. The actuator according to claim 3, further comprising a brake on a side opposite to the reducer with respect to the motor, wherein
the brake includes a main body and a rotating portion, and
the rotating portion is coaxial with the rotational shaft of the motor.

9. The actuator according to claim 8, further comprising a third bearing supported by the main body, wherein the third bearing is configured to rotatably support the rotational shaft of the motor.

10. The actuator according to claim 8, wherein the brake further includes:
a mover between the main body and the rotating portion,
an elastic member configured to apply elastic force toward the rotating portion to the mover, wherein the elastic member is fixed to the main body, and
an electromagnet configured to attract the mover toward the main body at a time of energization.

11. The actuator according to claim 8, wherein a part of the main body is nested in the cylindrical rotor.

12. The actuator according to claim 11, wherein
the cylindrical rotor includes a support that includes a plane orthogonal to a direction of extension of the cylindrical rotor,
the plane supports the rotational shaft of the motor,
the reducer is nested in the cylindrical rotor on a first side of the cylindrical rotor with the support as a boundary, and
the part of the main body is nested in the cylindrical rotor on a second side opposite to the first side with the support as the boundary.

13. The actuator according to claim 8, further comprising a second encoder configured to measure a rotational angle of the cylindrical rotor.

14. The actuator according to claim 13, wherein the second encoder is on the side on which the brake is located with respect to the motor.

15. The actuator according to claim 13, wherein
the rotational shaft of the motor is a hollow tube,
the rotational shaft of the motor includes a cable configured to connect the first encoder to the second encoder, and
the cable is inside the rotational shaft of the motor.

16. The actuator according to claim 2, wherein the torque sensor includes:
a first rotating body fixed to the output shaft,
a second rotating body,
a distortion part fixed to the first rotating body and the second rotating body, wherein the distortion part is configured to transmit rotational torque from the first rotating body to the second rotating body based on strain of the distortion part, and
a measuring unit configured to measure the rotational torque based on the strain of the distortion part.

17. The actuator according to claim 2, wherein
the rotational shaft of the motor is a hollow tube,
the rotational shaft of the motor includes a cable configured to connect the torque sensor to an external device, and
the cable is inside the rotational shaft of the motor.

18. An actuator, comprising:
a motor that includes a cylindrical rotor and a stator;
a reducer that has a cylindrical shape, wherein the reducer includes:
an input shaft coaxial with a rotational shaft of the motor, wherein the input shaft is nested in the cylindrical rotor;
an output shaft coaxial with the rotational shaft of the motor;
a cylindrical first outer peripheral surface nested in the cylindrical rotor; and
a cylindrical second outer peripheral surface, wherein a diameter of the cylindrical second outer peripheral surface is larger than a diameter of the cylindrical first outer peripheral surface;
a casing configured to support the stator and the cylindrical second outer peripheral surface of the reducer;
a torque sensor fixed to the output shaft, wherein the torque sensor is configured to measure torque based on rotation of the output shaft; and
a first encoder configured to measure a rotational angle of the output shaft, wherein the first encoder is between the torque sensor and the casing.

19. An actuator, comprising:
a motor that includes a cylindrical rotor and a stator;
a reducer that has a cylindrical shape, wherein the reducer includes:
an input shaft coaxial with a rotational shaft of the motor, wherein the input shaft is nested in the cylindrical rotor; and
an output shaft coaxial with the rotational shaft of the motor;
a casing configured to support the stator and the reducer;
a torque sensor fixed to the output shaft, wherein the torque sensor is configured to measure torque based on rotation of the output shaft;
a first encoder configured to measure a rotational angle of the output shaft, wherein the first encoder is between the torque sensor and the casing; and
a brake on a side opposite to the reducer with respect to the motor, wherein
the brake includes a main body and a rotating portion,
the rotating portion is coaxial with the rotational shaft of the motor,
the cylindrical rotor includes a support that includes a plane orthogonal to a direction of extension of the cylindrical rotor,
the plane supports the rotational shaft of the motor,
the reducer is nested in the cylindrical rotor on a first side of the cylindrical rotor with the support as a boundary, and
a part of the main body is nested in the cylindrical rotor on a second side opposite to the first side with the support as the boundary.

* * * * *